(12) United States Patent
Schwarz et al.

(10) Patent No.: US 11,755,122 B2
(45) Date of Patent: *Sep. 12, 2023

(54) HAND GESTURE-BASED EMOJIS

(71) Applicant: Microsoft Technology Licensing, LLC, Redmond, WA (US)

(72) Inventors: Julia Schwarz, Bellevue, WA (US); Michael Harley Notter, Woodinville, WA (US); Jenny Kam, Seattle, WA (US); Sheng Kai Tang, Redmond, WA (US); Kenneth Mitchell Jakubzak, Lynnwood, WA (US); Adam Edwin Behringer, Seattle, WA (US); Amy Mun Hong, Redmond, WA (US); Joshua Kyle Neff, Renton, WA (US); Sophie Stellmach, Kirkland, WA (US); Mathew J. Lamb, Seattle, WA (US); Nicholas Ferianc Kamuda, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,520

(22) Filed: May 23, 2022

(65) Prior Publication Data
US 2022/0283646 A1 Sep. 8, 2022

Related U.S. Application Data

(63) Continuation of application No. 16/888,562, filed on May 29, 2020, now Pat. No. 11,340,707.

(51) Int. Cl.
| | |
|---|---|
| *G06F 3/00* | (2006.01) |
| *G06F 3/01* | (2006.01) |
| *G06F 3/16* | (2006.01) |
| *G06T 13/40* | (2011.01) |
| *G06V 20/20* | (2022.01) |
| *G06V 40/20* | (2022.01) |
| *G06V 40/10* | (2022.01) |

(52) U.S. Cl.
CPC .............. *G06F 3/017* (2013.01); *G06F 3/012* (2013.01); *G06F 3/013* (2013.01); *G06F 3/167* (2013.01); *G06T 13/40* (2013.01); *G06V 20/20* (2022.01); *G06V 40/107* (2022.01); *G06V 40/28* (2022.01)

(58) Field of Classification Search
None
See application file for complete search history.

(56) References Cited

U.S. PATENT DOCUMENTS

2019/0122412 A1* 4/2019 Woo ..................... H04L 51/52

* cited by examiner

*Primary Examiner* — Martin Mushambo
(74) *Attorney, Agent, or Firm* — Alleman Hall Creasman & Tuttle LLP

(57) ABSTRACT

Examples are disclosed that relate to hand gesture-based emojis. One example provides, on a display device, a method comprising receiving hand tracking data representing a pose of a hand in a coordinate system, based on the hand tracking data, recognizing a hand gesture, and identifying an emoji corresponding to the hand gesture. The method further comprises presenting the emoji on the display device, and sending an instruction to one or more other display devices to present the emoji.

20 Claims, 11 Drawing Sheets

HAND GESTURE-BASED EMOJIS

CROSS REFERENCE TO RELATED APPLICATIONS

This application is a continuation of U.S. patent application Ser. No. 16/888,562, filed May 29, 2020, the entirety of which is hereby incorporated herein by reference for all purposes.

BACKGROUND

Emojis provide a mechanism to express emotion on a computing device. Emojis may take the form of a static or animated graphic, and often appear as a face or other imagery that conveys emotion. Emojis may be shared among users through various communication media such as email, chat, or text message.

SUMMARY

Examples are disclosed that relate to hand gesture-based emojis. One example provides, on a display device, a method comprising receiving hand tracking data representing a pose of a hand in a coordinate system, recognizing a hand gesture based on the hand tracking data, and identifying an emoji corresponding to the hand gesture. The method further comprises presenting the emoji on the display device, and sending an instruction to one or more other display devices to present the emoji.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, computing device users may convey emotions through emojis, which often take the form of faces or other imagery that convey the desired emotions. Emojis may be shared among users through various communication media such as email, chat, or text message.

Emojis may be shared in other settings as well, such as virtual spaces in which users participate via head-mounted display (HMD) devices. In some such virtual spaces, a user may use a handheld controller to interact with a user interface presented on an HMD device to share emojis. However, navigating the user interface may distract a user's attention away from the shared virtual space, and reduce the user's sense of immersion in the shared virtual space. Some HMD devices may allow emojis to be displayed using gestures, but may recognize only a limited set of gestures due to limitations on the poses that may be recognized.

Accordingly, examples are disclosed that relate to recognizing hand gestures based on articulated hand tracking data, and in response presenting emojis that corresponding to the recognized hand gestures. Articulated hand tracking data includes positional and rotational data for a plurality of joints of a user's hand, which allows the accurate detection of a wide range of hand gestures that may be mapped to a wide variety of emojis. Examples are also disclosed that relate to recognizing hand gestures performed by multiple users and the sharing of emojis among those users. Further, examples are disclosed that relate to associating emojis with objects, including physical objects and virtual objects presented in a shared virtual space. Additionally, examples are disclosed that relate to an emoji comprising multichannel audio signals that acoustically encode a spatial origin of the emoji, enabling a user receiving the emoji to locate the emoji, even when the emoji is located outside of the receiving user's field of view. Hand gestures may provide a natural and intuitive mechanism for users to share a wide variety of emojis with others in a virtual space and express emotion, without involving input device manipulation and user interface navigation.

Figure 1:
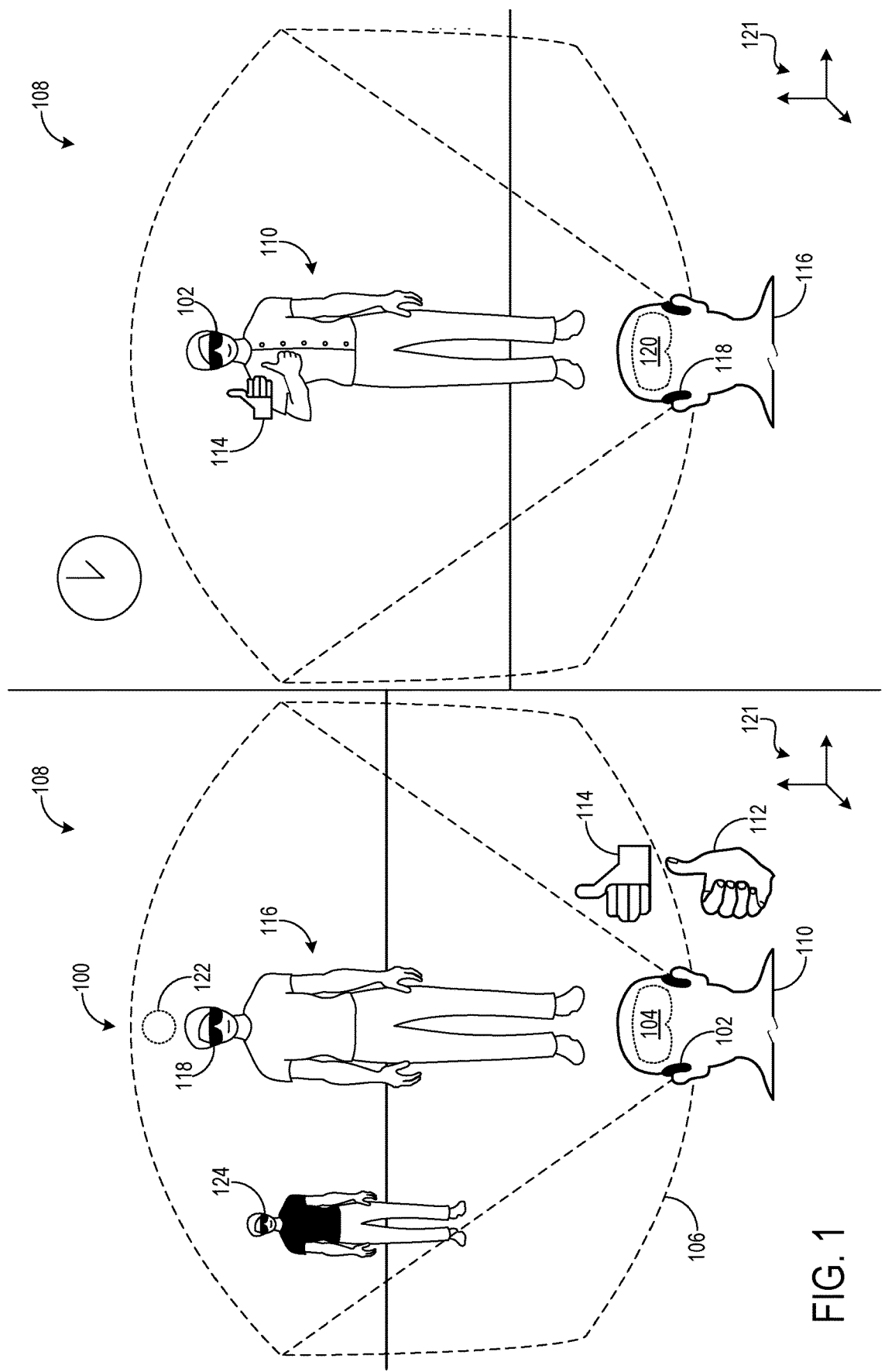
FIG. 1 shows a shared virtual space as viewed via example HMD devices.

FIG. 1 shows a shared virtual space 100 presented on an HMD device 102 via an integrated display 104, and illustrates the virtual space from two different perspectives, one shown on the left side of the figure and one on the right. Referring first to the left side, display 104 presents virtual imagery within a field of view 106 as part of a mixed reality experience provided on HMD device 102. Display 104 and the mixed reality experience may take any suitable form. For example, display 104 may comprise an augmented reality display that overlays imagery on or otherwise augments a view of a surrounding physical environment 108 with virtual imagery rendered on the display to provide an augmented reality experience. In such examples, the augmented reality display may be at least partially transparent to provide a view of physical environment 108 through display 104. In other examples, display 104 may comprise a virtual reality display that substantially obscures a view of physical environment 108 and provides an immersive virtual reality experience. In some examples, the opacity of display 104 is adjustable (e.g. via a dimming filter), enabling the display to function both as a substantially opaque display for virtual reality experiences and as a see-through display for augmented reality experiences.

In the depicted example, a user 110 wearing HMD device 102 performs a thumbs-up hand gesture with their right hand 112. Based on hand tracking data representing hand 112, HMD device 102 recognizes the thumbs-up hand gesture and identifies an emoji 114 corresponding to the hand gesture. As described in further detail below, HMD device 102 may include a sensor subsystem (e.g. including an image sensor) for detecting the pose of hands and formulating hand tracking data representing the poses of detected hands. HMD device 102 then presents emoji 114 via display 104, which includes the display of a graphical icon representing a hand making a thumbs-up gesture.

Another user 116 occupying physical environment 108 participates in shared virtual space 100 via an HMD device 118. HMD device 118 includes a display 120 on which a mixed reality experience is presented, including a view of user 102. In addition to presenting emoji 114 on display 104, HMD device 102 sends an instruction to HMD device 118 to present the emoji, and may specify a location in shared virtual space 100 at which to display the emoji. Any suitable channel may be used to send the instruction, such as a direct communication channel (e.g. Bluetooth, WiFi, optical, or acoustic channel) between HMD devices 102 and 118, or an indirect network connection. In response to receiving the instruction, HMD device 118 presents emoji 114, potentially at a specified location, on display 120. In this example, emoji 114 is shown on display 120 in proximity to right hand 112 of user 102. In other examples, emoji 114 may be displayed at any other suitable location. Further, as discussed in more detail below, a target icon 122 may be displayed for user 116 to allow an emoji to be presented to that specific user, rather than all users in the shared virtual space (e.g. to user 116 but not to user 124).

Hand tracking data representing the pose of hands as tracked by HMD devices 102 and 118 may be referenced to a shared coordinate system established for shared virtual space 100 and the HMD devices participating therein. In FIG. 1, this shared coordinate system is represented by coordinate axes 121. Any suitable mechanism may be used to establish the shared coordinate system. in one example, users optically scanning a code placed in the environment and thereby join a shared experience at a known location within the shared coordinate system. As another example, one or more physical objects or locations in a physical environment can be pre-designated as spatial anchors recognized by an HMD device, and a user may join a shared experience at a known location in the shared coordinate space based upon a detected spatial anchor. As another option, a user may join a shared experience by navigating to a selected server address via an application running on an HMD device and joining a server at the address. In such an example, the user may join the experience at a preselected initial location. The shared coordinate system provides a shared reference frame with which multiple devices can share commonly displayed virtual content, including but not limited to emojis as described herein, such that the virtual content may be perceived by multiple users from different perspectives with the same spatial properties (e.g. position and rotation) relative to the shared coordinate system. In some examples where different HMD devices are at different physical locations, one or more physical objects in one location may be displayed as virtual objects by an HMD device in another location.

Figure 2:
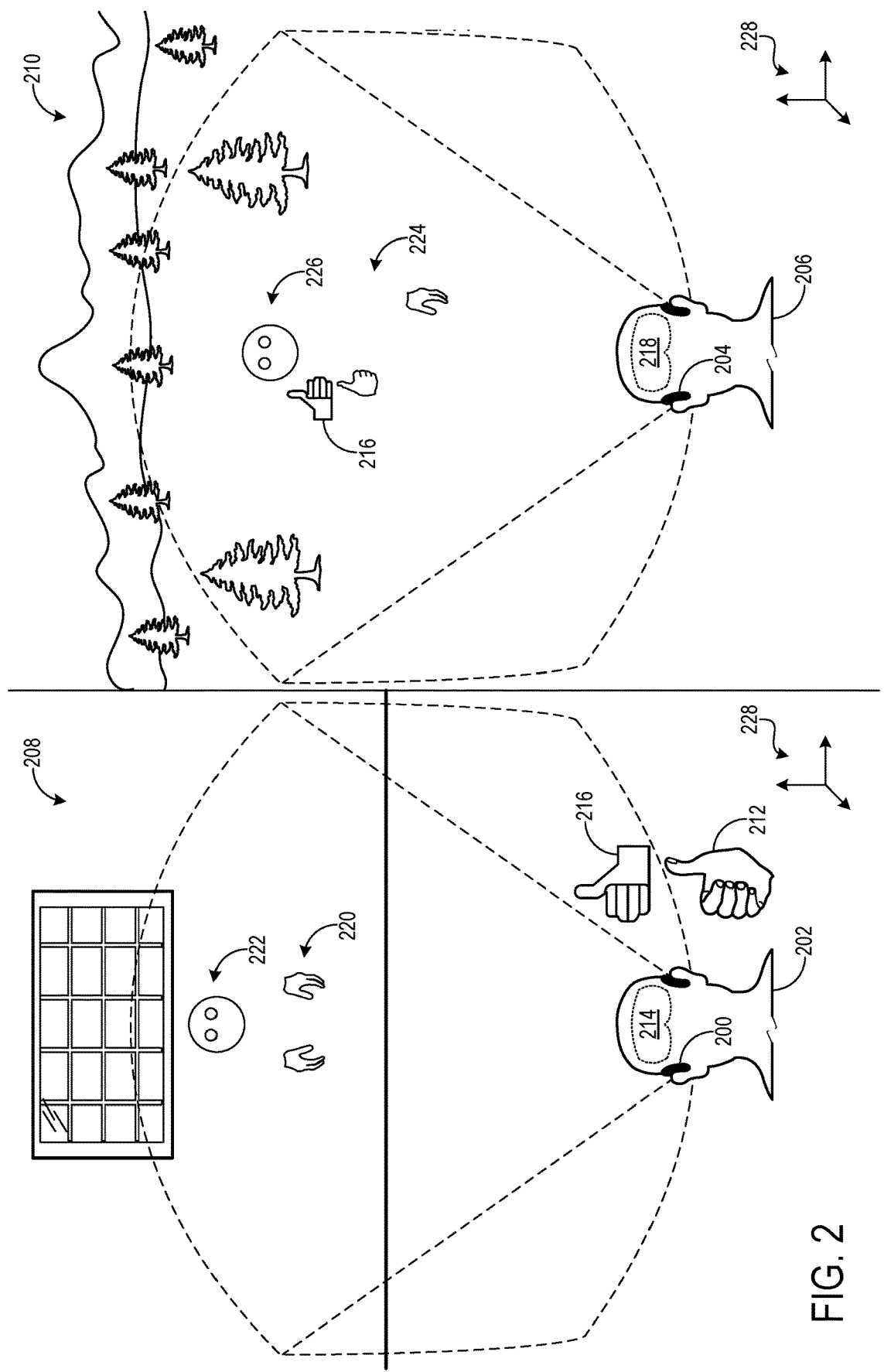
FIG. 2 depicts an example in which an emoji is shared with a remote HMD device.

In the example of FIG. 1, users 110 and 116 are in a common physical environment. In other examples, emojis may be sent between HMD devices that share a same shared virtual space but are located in different physical environments. FIG. 2 depicts an example in which an emoji is shared by an HMD device 200 worn by a user 202 in a first physical environment 208 with an HMD device 204 worn by a remote user 206 in a second, different physical environment 210. In the depicted example, user 202 performs a thumbs-up gesture with their right hand 212. HMD device 200 recognizes this hand gesture, for example via an on-board image sensing subsystem. In response, an emoji 216 associated with the thumbs-up gesture is presented on HMD device 200 via display 214. HMD device 200 further sends an instruction (e.g. over a network such as the Internet) to remote HMD device 204 instructing the remote HMD device to present the emoji at a specified location in the shared virtual space, which may be the same location or a different location than that used by display 214 to display the emoji. Upon receiving the instruction, remote HMD device 204 presents emoji 216 via a display 218.

In some examples, each HMD device 200 and 204 also may present representations of the users of the respective other HMD device. In this example, HMD device 200 presents hand representations 220 of the hands of remote user 206, and a head representation 222 of the remote user. Similarly, remote HMD device 204 presents hand representations 224 of the hands of user 202, and a head representation 226 of the user. In some examples, one or more of the representations may be animated based on sensor data. For example, hand representations 220 and/or 224 may be animated to track the motion of the hands of the user represented as determined from image data—e.g. as sensed by an on-board image sensing subsystem at HMD devices 200 and/or 204. Hand representations 214 and/or 220 further may be displayed in an idle state when the represented hands are outside of the field of view of a sensor subsystem. Likewise, head representations 222 and 226 may be animated based on a head pose and/or gaze direction of the represented users. In some examples, eyes of the head representations 222 and 226 may be animated to reflect the gaze direction of the represented users. User head pose may be determined via an on-board motion sensing subsystem (e.g. including an inertial measurement unit) at HMD devices 200 and/or 204, and gaze direction may be determined via an on-board gaze-tracking subsystem at one or both of the HMD devices, as examples. Additional detail regarding example hardware configurations of HMD devices 200 and 204 is described below with reference to FIG. 7.

As described above, HMD devices 200 and 204 share a coordinate system established for the shared virtual space in which they participate, as represented by coordinate axes 228. The shared coordinate system provides a reference frame in which emojis and representations of remote users may be exchanged in a spatially consistent manner. Users 202 and 206 thus may experience a sense of presence in a shared virtual experience, even though HMD devices 200 and 204 occupy different physical environments.

Figure 3:
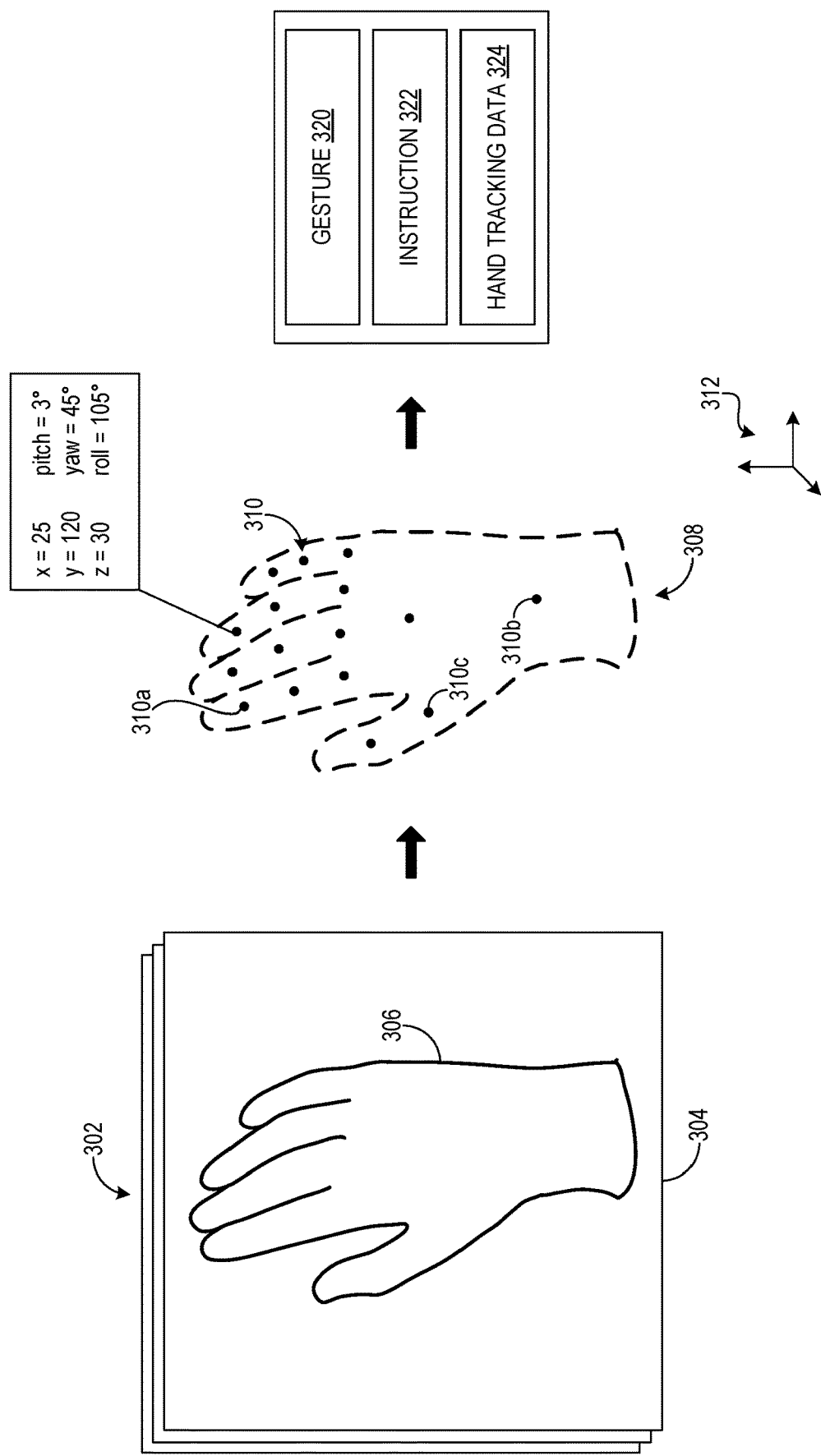
FIG. 3 schematically shows an example pipeline for implementing articulated hand tracking.

The HMD devices described herein may recognize hand gestures based on articulated hand tracking data. As used herein, "articulated hand tracking data" refers to data indicating one or more kinematic or spatial properties of each of plurality of joints of a hand model. FIG. 3 shows a high-level schematic depiction of an example pipeline 300 with which articulated hand tracking data may be formulated. At 302, a sequence of image frames is received including a frame 304 that captures a human hand 306. In some examples, the sequence of frames may be captured by an HMD device via an on-board image sensing subsystem. In other examples, an off-board image sensing subsystem may acquire the sequence of frames, such as an image sensor (e.g. webcam) arranged in a fixed location within a physical environment. The image sensing subsystem may include any suitable type of image senor(s), including but not limited to a depth senor, a color image sensor (e.g. configured to produce RGB image data), and stereo image sensors.

The image data captured in frame 304, and potentially image data from other frames in the sequence of frames, may be used to generate articulated hand tracking data. FIG. 3 shows an example hand model 308 that may be associated with articulated hand tracking data. Hand model 308 includes a plurality of joints 310 represented by dots, where one or more joints are each associated with a three-dimensional position and a three-dimensional rotation in a coordinate system, represented by coordinate axes 312. The coordinate system may be that of a virtual space that is shared with other HMDs, for example. In this example, the coordinate system is a Cartesian coordinate system. However, any suitable coordinate system, as well as any suitable representation of joints, may be used.

The articulated hand tracking data may be derived from frame 304 and potentially other frame(s) in any suitable manner. In some examples, joint positions and rotations may be determined by inputting frame 304 into a trained machine learning classifier, such as a neural network, decision tree, or other suitable trained function, that is configured to classify a probable state of each joint. In other examples, joint positions and rotations may be determined using a geometric fitting process that fits a detected hand (which may be detected and segmented via a classifier, as described above) to hand model 308 and then adjusts the model using a cost function to fit the model to frame 304. In some examples, constraints regarding the kinematic and physical properties of human hands—e.g. ranges of possible joint positions and rotations—may be used to inform the fitting process. Further, various image processing on frame 304 may be carried out during or prior to the fitting process, including but not limited to segmenting pixels that capture hand 306 from other pixels that do not capture the hand.

Collectively, the positions and rotations of joints 310 represent a pose of hand 306. Based on the pose of hand 306 derived from frame 304, and potentially other poses of the hand derived from other frame(s), a gesture performed by the hand may be recognized. The term "gesture recognition" as used herein may refer to recognizing a gesture based on a single hand pose or multiple hand poses. Any suitable method of gesture recognition may be utilized. For example, a recognizer may use a geometric approach in which gestures are recognized based on the position and/or rotation of one or more joints 310 of hand model 308. In some such examples, the recognizer may evaluate the distance between one or more joints 310, may consider the curl of one or more fingers of hand model 308, (as represented by a distance between a finger joint (e.g. joint 310a) and a wrist joint (e.g. joint 310b)), and/or may consider other suitable geometric factors when identifying a gesture. As another example, a thumbs-up gesture may be recognized based on identifying that a thumb is pointing in an upward direction, with the other four fingers being curled. The direction of the thumb may be determined by computing a vector between a thumb joint 310c and wrist joint 310b, and comparing the vector to a world-up vector, for example. The world-up vector may be determined by computing a gravity vector (e.g. via an accelerometer), for example.

In other examples, a recognizer may utilize a trained machine learning function to recognize gestures based on features of the articulated hand data. Any suitable machine learning function may be used to detect hand gestures, including neural network-based recognizers such as generative adversarial networks and/or deep neural networks. In such examples, the machine learning function may output a probability for each of a plurality of gestures that the frame of image data, from which the articulated hand data is derived, represents that gesture.

In other examples, a deep neural network may be used to map image data (e.g. derived from RGB image frames) directly to gestures without first determining articulated hand data. In yet other examples, a multi-layer perceptron may be used to recognize hand gestures, for example by evaluating hand joints over a sequence of frames and evaluating joint positions relative to a head joint (e.g. of a skeletal model representing a user's body) or wrist joint 310b.

Other methods of gesture recognition may match hand pose to a template associated with a gesture. For example, a template representing a gesture may be determined by computing the position and/or rotation of each joint 310 of hand model 308 relative to a reference joint (e.g. wrist joint 310b). For a given hand pose, a distance between each joint representing the hand pose and a corresponding joint of the template may be determined. This process may be carried out for different templates to identify a template that most closely matches the hand pose. The gesture corresponding to the identified template may then be recognized. In some examples, multiple templates may be determined for a common gesture. The multiple templates may represent variations of the common gesture, for example.

Further, in some examples, gesture recognition may consider a velocity of a hand (e.g. an average velocity of the joints of the hand) over a sequence of frames, potentially combined with a particular pose being held during the motion (e.g. the hand facing away from user).

FIG. 3 further shows a schematic representation of the output of a gesture 320 by a recognizer. Following the recognition of gesture 320, an emoji corresponding to the gesture may be identified and presented on a display device. As one example, or more of the HMD devices described above with reference to FIGS. 1 and 2 may implement aspects of pipeline 300 to recognize a thumbs-up gesture depicted therein and in response present a corresponding emoji. As also described above, upon identifying an emoji corresponding to hand gesture 320, an instruction 322 may be sent from a display device that identifies the gesture to one or more other display devices. The instruction 322 instructs the other display device(s) to present the emoji. In some examples, the instruction may be accompanied by image data (e.g. a graphical icon or animation to be displayed during presentation of the emoji), audio data (e.g. to be played back during presentation of the emoji), location data specifying a location at which to display the emoji in a shared coordinate space, an identification of a target (e.g. user, display device, hand, physical object, virtual object) to be associated with the emoji, and/or other data.

FIG. 3 also depicts the output of hand tracking data 324, which may be shared by a display device with other display device(s). For example with reference to FIG. 2, HMD device 200 may share hand tracking data with remote HMD device 204, enabling the remote HMD device to render representations 224 of the hands of user 202 based on the actual pose of that user's hands. In some examples, hand tracking data 324 that is shared may comprise all of the articulated hand tracking data, whereas in other examples the hand tracking data may represent a simplified version of the articulated hand tracking data—for example, the hand tracking data may include data indicating the respective positions of one or more fingertips and a palm.

Figure 4A:
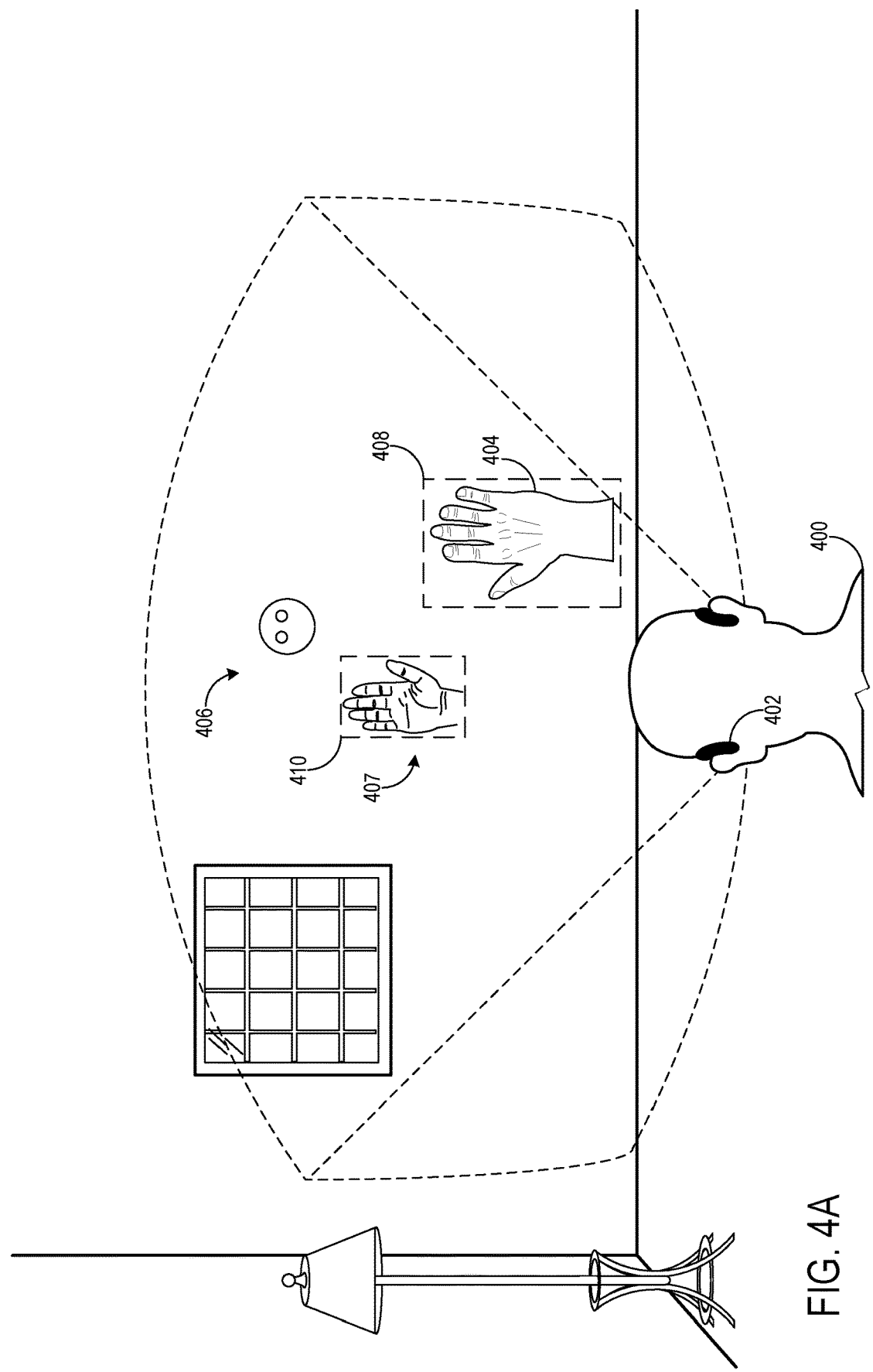
FIGS. 4A-4B illustrate an example hand gesture performed by two users.
Figure 4B:
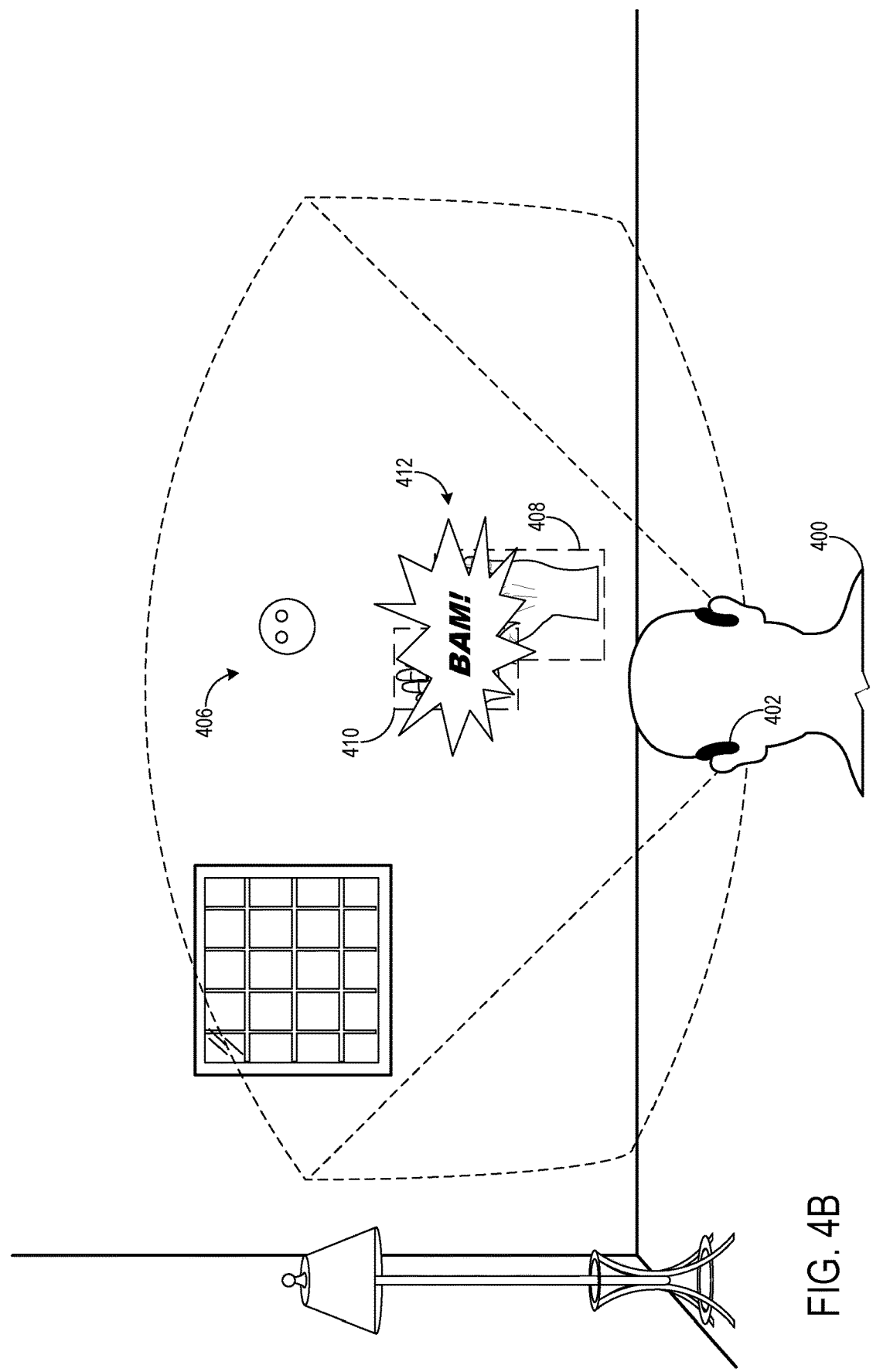

In some examples, a display device may present an emoji based on recognizing a hand gesture performed by multiple users. FIGS. 4A-4B show an example hand gesture performed by two users in the form of a high-five gesture. In FIG. 4A, a user 400 wearing an HMD device 402 initiates, using their right hand 404, a high-five gesture with a remote user who is shown via a head representation 406 presented on the HMD device. The right hand of the remote user is also shown via a hand representation 407 presented on HMD device 402, where the hand representation may be animated based on the pose of the remote user's hand (e.g. based on image data capturing the remote user's hand acquired by an HMD device worn by the remote user). A collider 408 is associated with the right hand 404 of user 400, and a collider 410 is associated with the right hand of the remote user. In this example, a high-five gesture between user 400 and the remote user is recognized based on identifying an intersection between colliders 408 and 410. In FIG. 4B, this intersection is identified at HMD device 402, prompting the presentation of an emoji 412 at the HMD device. The intersection detection may be performed by either or both HMD devices, and the HMD devices may communicate with one another regarding the detection of the gesture. In some examples, colliders 408 and 410 may be selectively enabled and disabled. For the illustrated high-five gesture, in some examples the colliders 408 and 410 may be enabled when the corresponding hands are held up, and otherwise disabled.

In some examples, a setting may be established for an emoji indicating display devices to which to send the emoji. For example, one setting (e.g. a default setting) may indicate that an emoji, such as the thumbs-up emoji illustrated in FIGS. 1 and 2, is to be shared with all other display devices in a shared virtual space. Other example emojis that can be shared among all users according to a default setting may include a waving gesture and a pointing gesture. In other examples, a setting may indicate that an emoji is to be shared with the devices of users that participated in the gesture. For example, such a setting may be associated with the high-five gesture illustrated in FIGS. 4A-4B, such that the corresponding emoji is shared from HMD device 400 to the HMD device associated with the remote user, and not other HMD device(s) in the shared virtual space. As a result, emoji 412 may be displayed on HMD device 400 and the remote user's HMD device, and not on other HMD devices in the shared virtual sp ace.

In some examples, an emoji may be displayed at location determined by a setting. In other examples, an emoji may be displayed at a location determined by a user, e.g. by a user making an input that establishes a target location to display an emoji. Returning to FIG. 1, HMD device 102 may present target icon 122 in proximity to user 116 of HMD device 118. If a gaze or head direction of user 110 of HMD device 102 intersects target icon 122 within a threshold interval of performing the thumbs-up gesture, the corresponding emoji may be shared with HMD device 118 and not other display devices within shared virtual space 100 such as an HMD device 124. In some examples, the intersection of user gaze direction with target icons may override a setting established for an emoji that identifies other display devices with which the emoji should be shared.

Figure 5:
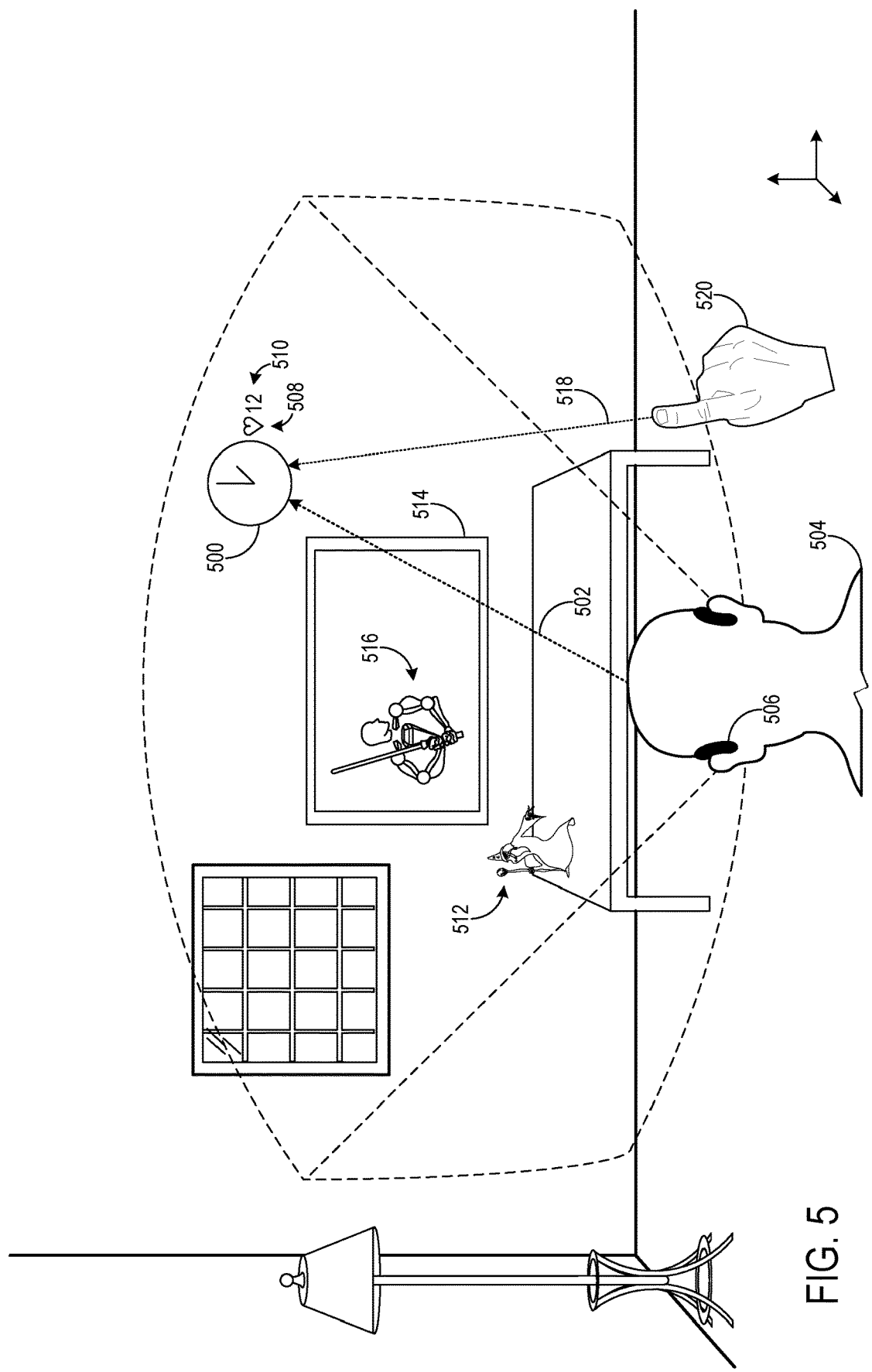
FIG. 5 illustrates an example in which an emoji is associated with a target object via gaze tracking.

In some examples, a user may target a physical or virtual object to share an emoji by associating the emoji with the object. FIG. 5 depicts an example in which a user targets a physical clock 500 based on a gaze direction 502 intersecting the clock to associate an emoji with the clock. As one example, the emoji may include a "like" emoji 508, whose presentation includes the display of a graphical icon indicating that the clock has been liked, and the display of a counter 510 indicating the number of times the clock has been liked (e.g. by users in the shared virtual space associated with the clock). An emoji may be associated with a virtual object in a similar manner. In some examples a virtual object may be viewable only by designated users, rather than all users in the shared virtual space.

As yet another example of a target with which to associate an emoji, FIG. 5 shows a physical display 514 presenting an image 516. An emoji, such as a like emoji, may be associated with image 516 based on gaze direction 502 intersecting the displayed location of the image. In this example, image 516 is hosted on a website, such that the like emoji causes a like to be sent to the website to thereby increment a like counter associated with the image.

Mechanisms other than gaze intersection may be used to identify targets for association with emojis. As another example, FIG. 5 illustrates user interaction with clock 500 in the form of a pointing direction 518 of a hand 520 of user 506 intersecting the clock. In response to this intersection, a like emoji may be associated with clock 500. HMD device 506 may output a ray representing pointing direction 518 to help target the pointing direction. Such a ray also may be communicated to other devices so that other users can find an object to which user 506 is pointing. Yet other mechanisms for identifying targets for associating with emojis may be employed, including but not limited to speech input.

In some examples, gesture detection may be disabled when a user is detected to be interacting with an object, such as a mobile phone, handheld controller, or virtual object. Gesture detection then may be enabled after the user ceases interacting with the object.

Figure 6:
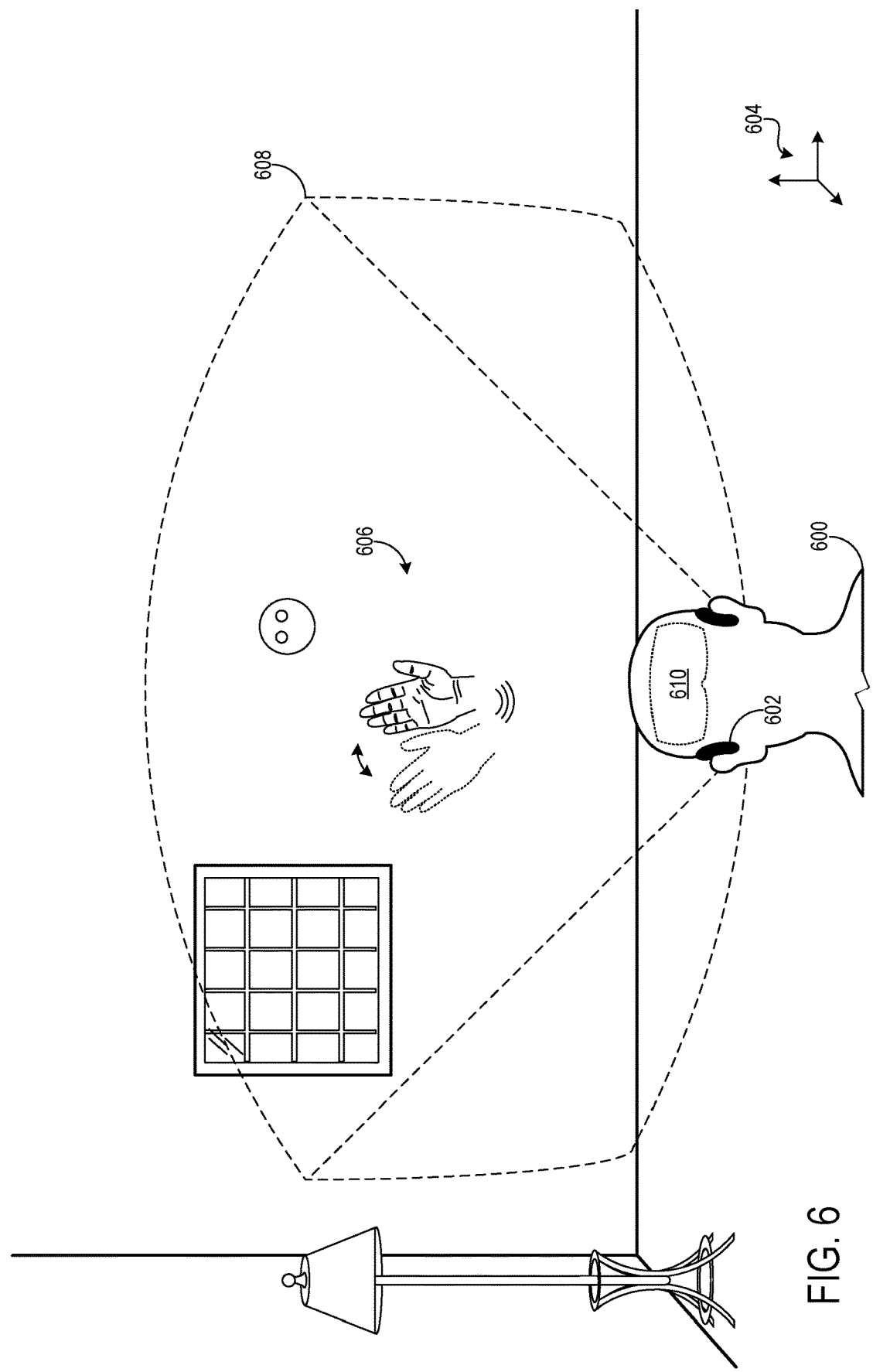
FIG. 6 illustrates an example in which an emoji includes a multichannel audio signal.

An emoji as described herein may include any suitable content, including but not limited to static imagery, animated imagery, video, and/or sound. FIG. 6 illustrates an example in which the presentation of an emoji includes sound that helps a receiving user to locate the spatial origin of the emoji. In this example, a remote user performs a hand gesture in the form of a wave, resulting in the reception at HMD device 602 of an instruction to present an emoji corresponding to the wave. The instruction further includes an indication to present the emoji with a multichannel audio signal that acoustically encodes a spatial origin of the emoji (e.g. in a shared coordinate system represented by a coordinate axis 604). The multichannel audio signal may encode binaural audio, for example. The multichannel audio signal may assist user 600 in locating the spatial origin of the emoji and the remote user, particularly at times in which a representation 606 of the remote user is outside of a field of view 608 of a display 610 of HMD device 602.

Any suitable hand gestures may be detected according to the approaches described herein. Other example hand gestures include a heart gesture in which the shape of a heart is formed by two hands of one user or by the hands of two users, a pointing gesture, a pinch gesture in which a hand opens and then pinches, an open hand gesture in which a user opens a hand, and a handshake gesture performed by two hands of two users. Further, hand gestures are contemplated that are sketched out by hand motion—for example, a smiley face emoji may be presented in response to hand motion tracing the approximate shape of a smiley face (e.g. tracing a circle outlining the face and an arc representing a mouth). Moreover, examples are contemplated in which hand gestures are performed by a hand manipulating an input device such as a handheld controller. In such examples, input applied to the input device may be considered part of the hand gesture—for example, actuation of a button on the input device may initiate and/or end input of a hand gesture, or while actuated may designate input as tracing a shape to be interpreted as a hand gesture. Further, the approaches described herein may be implemented at any suitable display device including but not limited to HMD devices. As one example, recognized hand gestures may cause the input of an emoji to a mobile computing device, where the emoji may be shared with another device via text message. In another example, an emoji may be sent to a mobile phone, laptop, or other computing device participating in a meeting (e.g., via a meeting or collaboration application) with an HMD device or other computing device that sends the emoji. In one such example, the emoji may be sent as a chat message in the meeting. Still further, hand gestures may be recognized in any suitable manner including via mechanisms other than the use of image data. For example, a wearable device such as a glove or forearm device may be used to detect the pose of a hand for the purpose of recognizing hand gestures.

Figure 7:
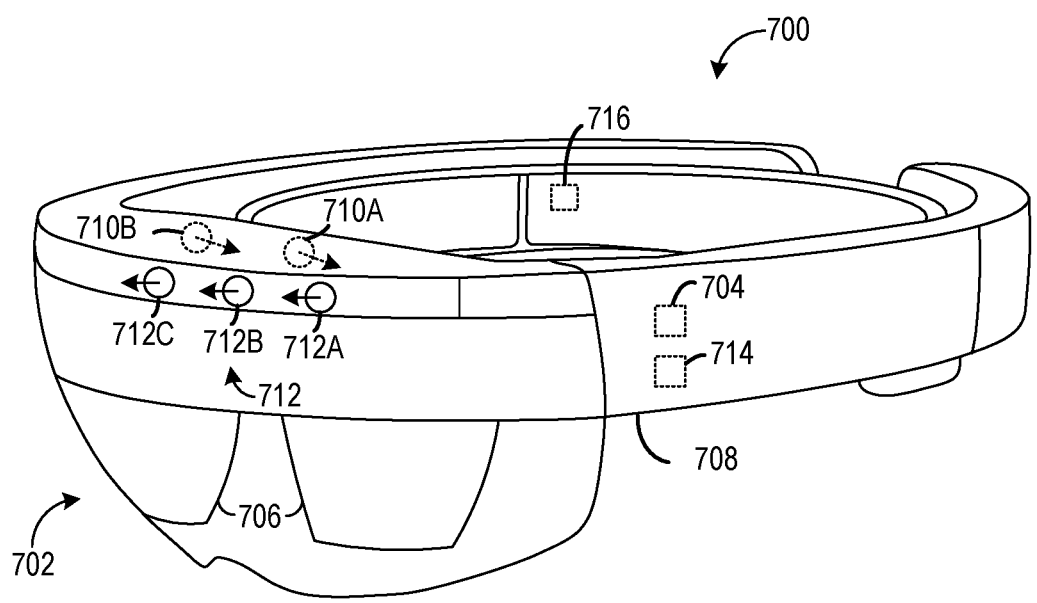
FIG. 7 shows another example HMD device.

FIG. 7 shows another example HMD device 700. HMD device 700 includes a near-eye display 702 configured to present any suitable type of visual experience. In some examples, display 702 is substantially opaque, presenting virtual imagery as part of a virtual reality experience in which a wearer of HMD device 700 is completely immersed in the virtual reality experience. In other implementations, display 702 is at least partially transparent, allowing a user to view presented virtual imagery along with a real-world background viewable through the display to form an augmented reality experience, such as a mixed reality experience. In some examples, the opacity of display 702 is adjustable (e.g. via a dimming filter), enabling the display to function both as a substantially opaque display for virtual reality experiences and as a see-through display for augmented reality experiences. HMD device 700 may represent any of the HMD devices in FIGS. 1-6, as examples.

In augmented reality implementations, display 702 may present augmented reality objects that appear display-locked and/or world-locked. A display-locked augmented reality object may appear to move along with a perspective of the user as a pose (e.g. six degrees of freedom (DOF): x/y/z/yaw/pitch/roll) of HMD device 700 changes. As such, a display-locked, augmented reality object may appear to occupy the same portion of display 702 and may appear to be at the same distance from the user, even as the user moves in the surrounding physical space. A world-locked, augmented reality object may appear to remain in a fixed location in the physical space, even as the pose of HMD device 700 changes. In some examples, a world-locked object may appear to move in correspondence with movement of a real, physical object. In yet other examples, a virtual object may be displayed as body-locked, in which the object is located to an estimated pose of a user's head or other body part.

HMD device 700 may take any other suitable form in which a transparent, semi-transparent, and/or non-transparent display is supported in front of a viewer's eye(s). Further, examples described herein are applicable to other types of display devices, including other wearable display devices and non-wearable display devices such as a television, monitor, and mobile device display. In some examples, a display device including a non-transparent display may be used to present virtual imagery. Such a display device may overlay virtual imagery (e.g. representations of hand motion and/or objects) on a real-world background presented on the display device as sensed by an imaging system.

Any suitable mechanism may be used to display images via display 702. For example, display 702 may include image-producing elements located within lenses 706. As another example, display 702 may include a liquid crystal on silicon (LCOS) device or organic light-emitting diode (OLED) microdisplay located within a frame 708. In this example, the lenses 706 may serve as, or otherwise include, a light guide for delivering light from the display device to the eyes of a wearer. In yet other examples, display 702 may include a scanning mirror system (e.g. a microelectromechanical display) configured to scan light from a light source in one or more directions to thereby form imagery. In some examples, eye display 702 may present left-eye and right-eye imagery via respective left-eye and right-eye displays.

HMD device 700 includes an on-board computer 704 operable to perform various operations related to receiving user input (e.g. voice input and gesture recognition, eye gaze detection), capturing hand motion and the surrounding physical space, processing data obtained from capturing hand motion and the physical space, presenting imagery (e.g. representations of hands, representations of users, and/or virtual objects) on display 702, and/or other operations described herein. In some implementations, some to all of the computing functions described above may be performed off-board. Example computer hardware is described in more detail below with reference to FIG. 10.

HMD device 700 may include various sensors and related systems to provide information to on-board computer 704. Such sensors may include, but are not limited to, one or more inward facing image sensors 710A and 710B and/or one or more outward facing image sensors 712A, 712B, and 712C of an imaging system 712, an inertial measurement unit (IMU) 714, and one or more microphones 716 such as a directional microphone array. The one or more inward facing image sensors 710A, 710B may acquire gaze tracking information from a wearer's eyes (e.g. sensor 710A may acquire image data for one of the wearer's eye and sensor 710B may acquire image data for the other of the wearer's eye). One or more such sensors may be used to implement a sensor system of HMD device 700, for example.

Where gaze-tracking sensors are included, on-board computer 704 may determine gaze directions of each of a wearer's eyes in any suitable manner based on the information received from the image sensors 710A, 710B. The one or more inward facing image sensors 710A, 710B, and on-board computer 704 may collectively represent a gaze detection machine configured to determine a wearer's gaze target or gaze direction on display 702. In other implementations, a different type of gaze detector/sensor may be employed to measure one or more gaze parameters of the user's eyes. Examples of gaze parameters measured by one or more gaze sensors that may be used by on-board computer 704 to determine an eye gaze sample may include an eye gaze direction, head orientation, eye gaze velocity, eye gaze acceleration, and/or change in angle of eye gaze direction. In some implementations, gaze tracking may be recorded independently for both eyes.

Imaging system 712 may collect image data (e.g. images, video) of a surrounding physical space in any suitable form. Image data collected by imaging system 712 may be used to measure physical attributes of the surrounding physical space. While the inclusion of three image sensors 712A-712C in imaging system 712 is shown, the imaging system may implement any suitable number of image sensors. As examples, imaging system 712 may include a pair of greyscale cameras (e.g. arranged in a stereo formation) configured to collect image data in a single color channel. Alternatively or additionally, imaging system 712 may include one or more color cameras configured to collect image data in one or more color channels (e.g. RGB) in the visible spectrum. Alternatively or additionally, imaging system 712 may include one or more depth cameras configured to collect depth data. In one example, the depth data may take the form of a two-dimensional depth map having a plurality of depth pixels that each indicate the depth from a corresponding depth camera (or other part of HMD device 700) to a corresponding surface in the surrounding physical space. A depth camera may assume any suitable form, such as that of a time-of-flight depth camera or a structured light depth camera. Alternatively or additionally, imaging system 712 may include one or more infrared cameras configured to collect image data in the infrared spectrum. In some examples, an infrared camera may be configured to function as a depth camera. In some examples, one or more cameras may be integrated in a common image sensor—for example, an image sensor may be configured to collect RGB color data and depth data.

Data from imaging system 712 may be used by on-board computer 704 to detect movements, such as gesture-based inputs or other movements performed by a wearer, person, or physical object in the surrounding physical space. In some examples, HMD device 700 may capture hand motion performed by a wearer by acquiring image data via imaging system 712 that captures the hand motion. In some example, HMD device 700 may formulate articulated hand tracking data based on image data acquired via imaging system 712, which may be used for emoji presentation as described herein. HMD device 700 may also image objects manipulated by hand motion via imaging system 712. Data from imaging system 712 may be used by on-board computer 704 to determine direction/location and orientation data (e.g. from imaging environmental features) that enables position/motion tracking of HMD device 700 in the real-world environment. In some implementations, data from imaging system 712 may be used by on-board computer 704 to construct still images and/or video images of the surrounding environment from the perspective of HMD device 700. In some examples, HMD device 700 may utilize image data collected by imaging system 712 to perform simultaneous localization and mapping (SLAM) of the surrounding physical space.

IMU 714 may be configured to provide position and/or orientation data of HMD device 700 to on-board computer 704. In one implementation, IMU 714 may be configured as a three-axis or three-degree of freedom (7DOF) position sensor system. This example position sensor system may, for example, include three gyroscopes to indicate or measure a change in orientation of HMD device 700 within three-dimensional space about three orthogonal axes (e.g. roll, pitch, and yaw).

In another example, IMU 714 may be configured as a six-axis or six-degree of freedom (6DOF) position sensor system. Such a configuration may include three accelerometers and three gyroscopes to indicate or measure a change in location of HMD device 700 along three orthogonal spatial axes (e.g. x/y/z) and a change in device orientation about three orthogonal rotation axes (e.g. yaw/pitch/roll). In some implementations, position and orientation data from imaging system 712 and IMU 714 may be used in conjunction to determine a position and orientation (or 6DOF pose) of HMD device 700. In yet other implementations, the pose of HMD device 700 may be computed via visual inertial SLAM.

HMD device 700 may also support other suitable positioning techniques, such as GPS or other global navigation systems. Further, while specific examples of position sensor systems have been described, it will be appreciated that any other suitable sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g. visible light cameras, infrared light cameras, time-of-flight depth cameras, structured light depth cameras, etc.), communication devices (e.g. WIFI antennas/interfaces), etc.

The one or more microphones 716 may be configured to collect audio data from the surrounding physical space. Data from the one or more microphones 716 may be used by on-board computer 704 to recognize voice commands provided by the wearer to control the HMD device 700. In some examples, HMD device 700 may record audio data via the one or more microphones 716 by capturing speech uttered by a wearer. The speech may be used to annotate a demonstration in which hand motion performed by the wearer is recorded, to identify a target with which to associate an emoji, or for any other suitable purpose.

While not shown in FIG. 7, on-board computer 704 may include a logic subsystem and a storage subsystem holding instructions executable by the logic subsystem to perform any suitable computing functions. For example, the storage subsystem may include instructions executable to implement one or more of image data acquisition, gesture recognition, emoji identification, emoji presentation, and instruction transmission. Example computing hardware is described below with reference to FIG. 10.

Figure 8:
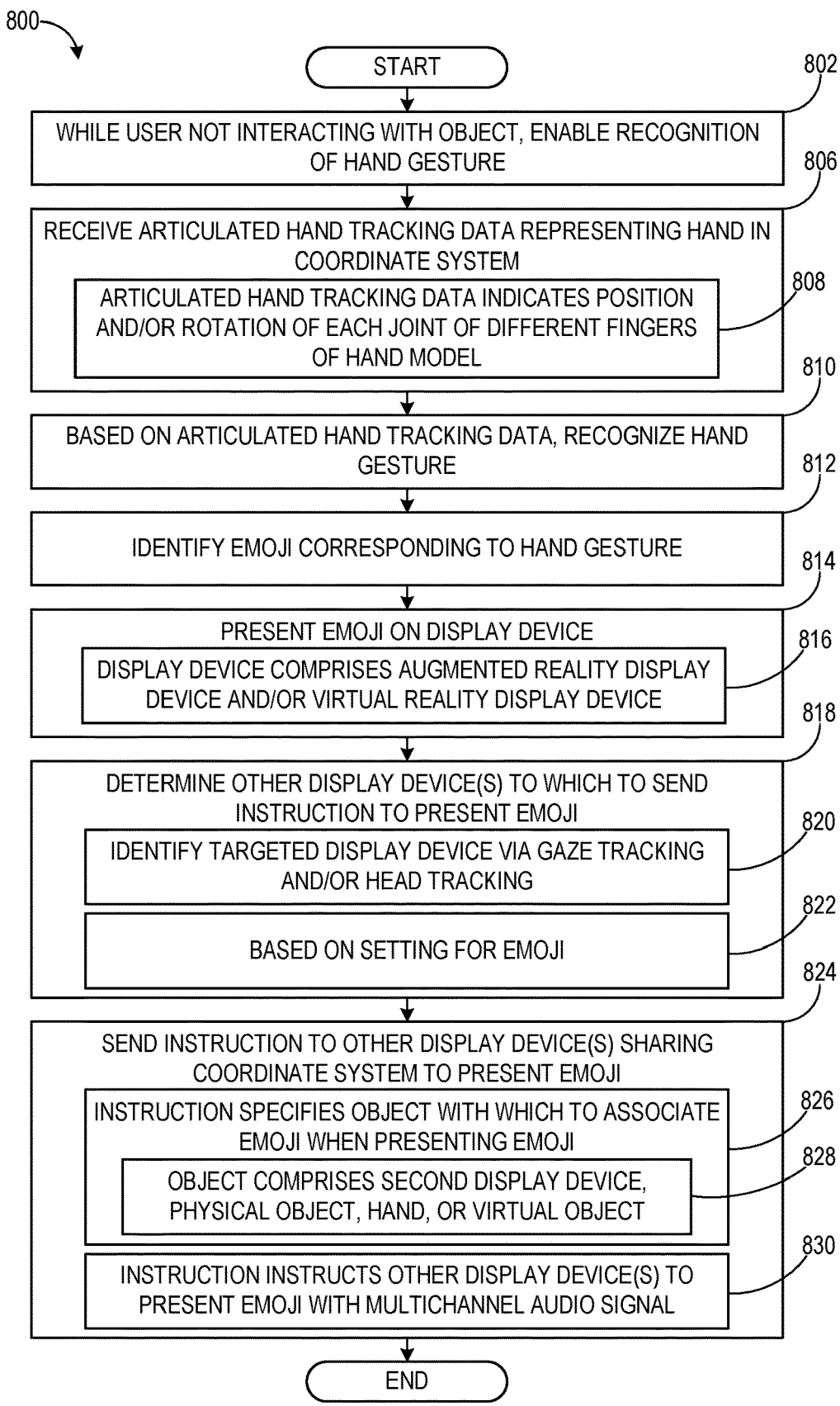
FIG. 8 shows a flowchart illustrating an example method of presenting emojis based on hand gestures.

FIG. 8 shows a flowchart illustrating an example method 800 of presenting emojis based on hand gestures. Aspects of method 800 may be implemented at one or more of the HMD devices described herein, for example.

At 802, method 800 includes, while a user is not interacting with an object, enabling recognition of a hand gesture. At 806, method 800 includes receiving articulated hand tracking data representing a hand in a coordinate system. The articulated hand tracking data may indicate 808 the position and/or rotation of each joint of different fingers of a hand model.

At 810, method 800 includes, based on the articulated hand tracking data, recognizing a hand gesture. In response, at 812, method 800 includes identifying an emoji corresponding to the hand gesture, and at 814, presenting the emoji on a display device. The display device may comprise 816 one or more of an augmented reality display device and a virtual reality display device.

In other examples, a neural network-based function may be used to recognize the hand gesture based on image data (e.g. RGB image data) without first determining articulated hand tracking data to recognize the hand gesture.

At 818, method 800 includes determining one or more other display devices to which to send an instruction to present the emoji. In some examples, determining the one or more other display devices may include 820 identifying a targeted display device via gaze tracking and/or head tracking. In other examples, the one or more other display devices may be identified based on a setting 822 for the emoji.

At 824, method 800 includes sending the instruction to the one or more other display devices sharing the coordinate system to present the emoji. The one or more other display devices may include an HMD device, a mobile computing device (e.g. smartphone, laptop), a television, a monitor, and/or any other suitable display device. The instruction may specify 826 an object with which to associate the emoji when presenting the emoji. The object may comprise 828 a second display device, a physical object, the hand, or a virtual object. The instruction may instruct 830 the one or more other display devices to present the emoji with a multichannel audio signal that acoustically encodes a spatial origin of the emoji. The instruction further may specify a location in a shared coordinate system at which to display the emoji.

Figure 9:
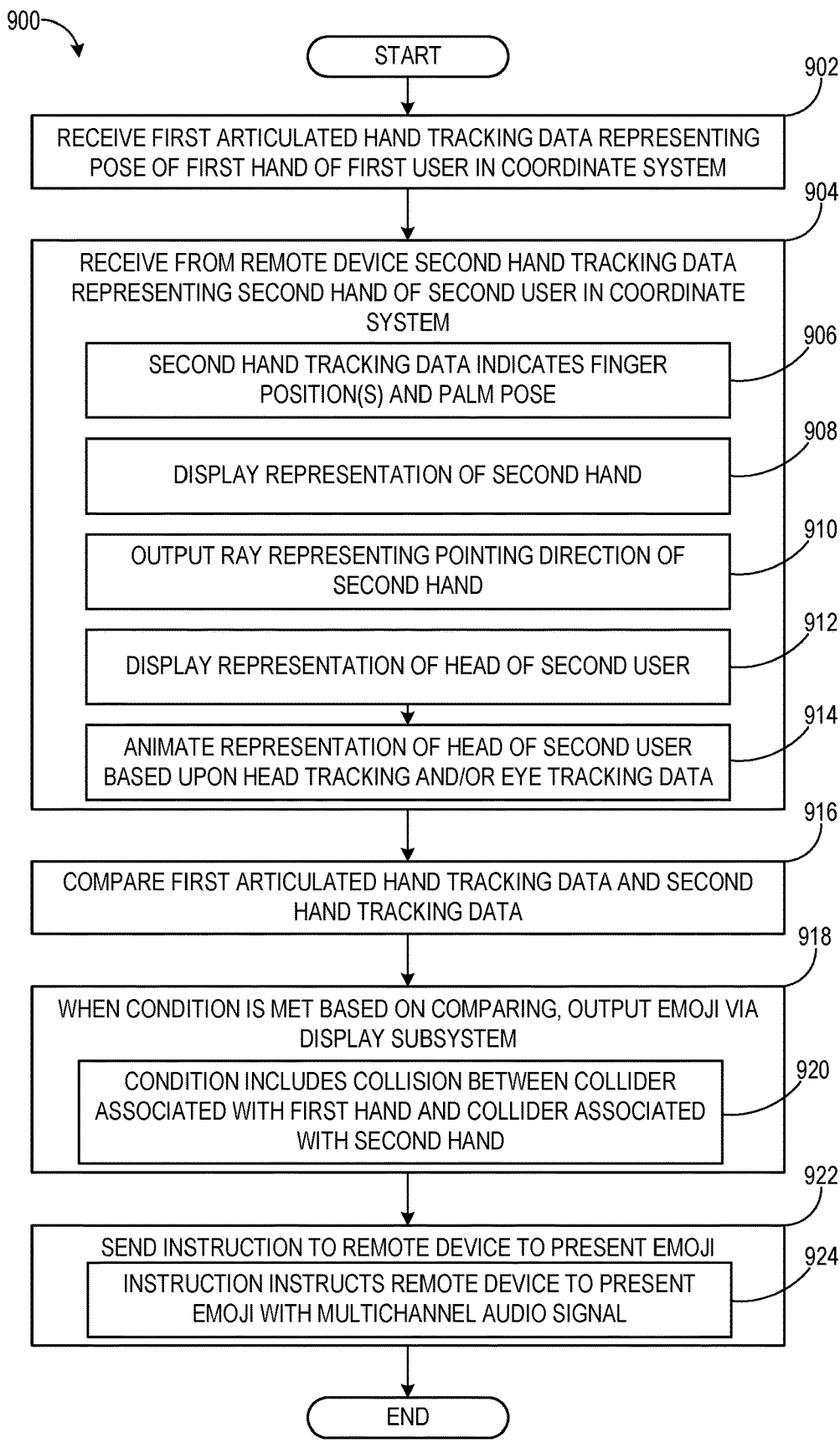
FIG. 9 shows a flowchart illustrating an example method of outputting an emoji at a display device based on comparing first and secondhand tracking data.

FIG. 9 shows a flowchart illustrating a method 900 of outputting an emoji at a display device based on comparing first articulated hand tracking data and second hand tracking data. Aspects of method 900 may be implemented at one or more of the HMD devices described herein, for example.

At 902, method 900 includes receiving first articulated hand tracking data representing a pose of a first hand of a first user in a coordinate system. At 904, method 900 includes receiving, from a remote device via a communication subsystem of the display device, second hand tracking data representing a second hand of a second user in the coordinate system. The second hand tracking data may indicate 906 one or more finger positions and a palm pose, or may represent a full set of articulated hand tracking data. In some examples, e.g. where the second user is located in a different physical environment, method 900 may include, at 908, displaying a representation of the second hand. Further, in some examples, where the second hand is performing a pointing gesture, method 900 may comprise, at 910, outputting a ray indicating a pointing direction of the second hand. A pointing direction of a first hand may similarly be output.

Further, in some examples, a representation of a head (or other suitable body part) of the second user may be output, as indicated at 912. In such examples, the representation of the head (or other suitable body part) of the second user may be animated based upon motion tracking data, such as head tracking data and/or eye tracking data, as indicated at 914.

At 916, method 900 includes comparing the first articulated hand tracking data and the second hand tracking data. At 918, method 900 includes, when a condition is met based on the comparing, outputting an emoji via a display subsystem of the display device. The condition may include, at 920, an intersection between a collider associated with the first hand and a collider associated with the second hand.

At 922, method 900 includes sending an instruction to the remote device to present the emoji. The instruction may instruct 924 the remote device to present the emoji with a multichannel audio signal that acoustically encodes a spatial origin of the emoji.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
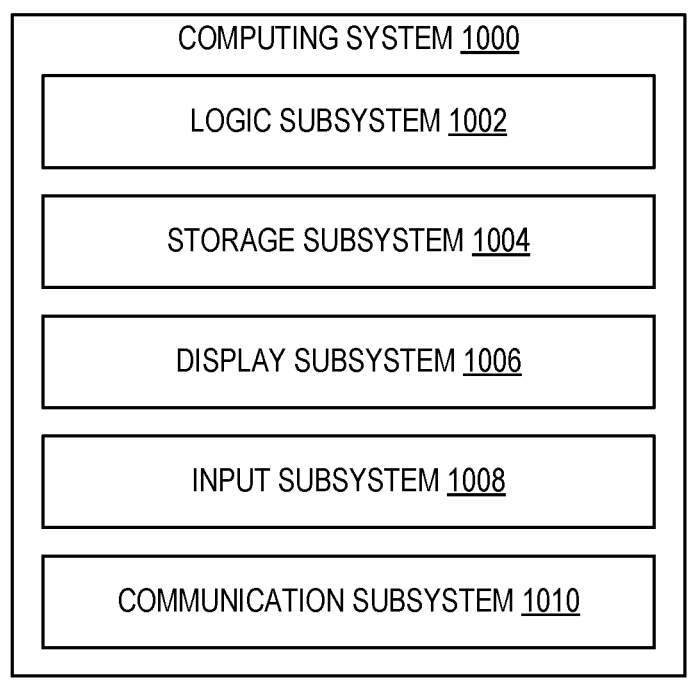
FIG. 10 shows a block diagram of an example computing device.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g. smart phone), and/or other computing devices.

Computing system 1000 includes a logic subsystem 1002 and a storage subsystem 1004. Computing system 1000 may optionally include a display subsystem 1006, input subsystem 1008, communication subsystem 1010, and/or other components not shown in FIG. 10.

Logic subsystem 1002 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 1004 includes one or more physical devices configured to hold instructions executable by the logic machine to implement the methods and processes described herein. When such methods and processes are implemented, the state of storage subsystem 1004 may be transformed—e.g. to hold different data.

Storage subsystem 1004 may include removable and/or built-in devices. Storage subsystem 1004 may include optical memory (e.g. CD, DVD, HD-DVD, Blu-Ray Disc, etc.), semiconductor memory (e.g. RAM, EPROM, EEPROM, etc.), and/or magnetic memory (e.g. hard-disk drive, floppy-disk drive, tape drive, MRAM, etc.), among others. Storage subsystem 1004 may include volatile, nonvolatile, dynamic, static, read/write, read-only, random-access, sequential-access, location-addressable, file-addressable, and/or content-addressable devices.

It will be appreciated that storage subsystem 1004 includes one or more physical devices. However, aspects of the instructions described herein alternatively may be propagated by a communication medium (e.g. an electromagnetic signal, an optical signal, etc.) that is not held by a physical device for a finite duration.

Aspects of logic subsystem 1002 and storage subsystem 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1006 may be used to present a visual representation of data held by storage subsystem 1004. This visual representation may take the form of a graphical user interface (GUI). As the herein described methods and processes change the data held by the storage machine, and thus transform the state of the storage machine, the state of display subsystem 1006 may likewise be transformed to visually represent changes in the underlying data. Display subsystem 1006 may include one or more display devices utilizing virtually any type of technology. Such display devices may be combined with logic subsystem 1002 and/or storage subsystem 1004 in a shared enclosure, or such display devices may be peripheral display devices.

When included, input subsystem 1008 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

Another example provides, on a display device, a method comprising receiving hand tracking data representing a pose of a hand in a coordinate system, based on the hand tracking data, recognizing a hand gesture, identifying an emoji corresponding to the hand gesture, presenting the emoji on the display device, and sending an instruction to one or more other display devices to present the emoji. In such an example, the one or more other display devices may comprise a targeted display device identified via one or more of gaze tracking and head tracking. In such an example, the instruction alternatively or additionally may be sent to all display devices sharing the coordinate system. In such an example, the method alternatively or additionally may comprise determining the one or more display devices to which the instruction is sent based upon a setting for the emoji. In such an example, the instruction alternatively or additionally may specify an object with which to associate the emoji when presenting the emoji. In such an example, the object may comprise a second display device in the coordinate system, a physical object in the coordinate system, the hand, or a virtual object in the coordinate system. In such an example, the hand tracking data may indicate one or more of a position and a rotation of each of a plurality of joints of a plurality of different fingers of a hand model in a coordinate system. In such an example, the instruction alternatively or additionally may instruct the one or more other display devices to present the emoji with a multichannel audio signal that acoustically encodes a spatial origin of the emoji in the coordinate system. In such an example, the method alternatively or additionally may comprise disabling recognition of the hand gesture in response to detecting a user interaction with an object. In such an example, the display device may comprise one or more of an augmented reality display and a virtual reality display. In such an example, the hand tracking data alternatively or additionally may comprise articulated hand tracking data.

Another example provides a display device, comprising a logic subsystem, a communication subsystem, a display subsystem, a sensor subsystem, and a storage subsystem comprising instructions executable by the logic subsystem to receive from the sensor subsystem first articulated hand tracking data representing a pose of a first hand of a first user in a coordinate system, receive, from a remote device via the communication subsystem, second hand tracking data representing a second hand of a second user in the coordinate system, compare the first articulated hand tracking data and the second hand tracking data, and when a condition is met based on the comparing, output an emoji via the display subsystem. In such an example, the second hand tracking data may indicate one or more finger positions and a palm pose. In such an example, the condition may include a collision between a collider associated with the first hand and a collider associated with the second hand. In such an example, the display device alternatively or additionally may comprise instructions executable to display via the display subsystem a representation of the second hand. In such an example the display device alternatively or additionally may comprise instructions executable to receive eye tracking data indicating a gaze direction of the second user, and to display via the display subsystem a representation of the second user, the representation being animated based on the eye tracking data. In such an example, the display device alternatively or additionally may comprise instructions executable to output a ray representing a pointing direction of the second hand. In such an example, the display device alternatively or additionally may comprise instructions executable to send an instruction to the remote device to present the emoji. In such an example, the instruction alternatively or additionally may instruct the remote device to present the emoji with a multichannel audio signal that acoustically encodes a spatial origin of the emoji in the coordinate system.

Another example provides a display device, comprising a logic subsystem, a communication subsystem, a sensor subsystem, and a storage subsystem comprising instructions executable by the logic subsystem to receive from the sensor subsystem articulated hand tracking data representing a pose of a hand in a coordinate system, based on the articulated hand tracking data, recognizing a hand gesture, identifying an emoji corresponding to the hand gesture, determining a display device to which to send an instruction to present the emoji, and send via the communication subsystem the instruction to present the emoji to the display device with a multichannel audio signal that acoustically encodes a spatial origin of the emoji.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The invention claimed is:

1. On a computing device, a method comprising:
    receiving user input data targeting an object in an environment with which to associate an emoji, the object being located at a location in a coordinate system of the environment;
    receiving hand tracking data representing a pose of a hand in the coordinate system, the hand tracking data comprising data regarding a spatial position in the coordinate system of each joint of a plurality of joints of a hand model;
    based on the hand tracking data, recognizing a hand gesture;
    identifying an emoji corresponding to the hand gesture;

outputting the emoji for display as associated with the object; and sending an instruction to one or more other computing devices to present the emoji as associated with the object.

2. The method of claim 1, wherein the object comprises a physical object or a virtual object.

3. The method of claim 1, wherein the user input comprises one or more of a gaze input, a pointing gesture, a speech input or a head gesture.

4. The method of claim 1, wherein the emoji comprises one or more of static imagery, animated imagery, video, or sound.

5. The method of claim 1, wherein the emoji comprises a multichannel audio signal that encodes a spatial origin of the emoji in the coordinate system.

6. The method of claim 1, wherein sending the instruction to one or more other display comprises sending the instructions to all display devices sharing an augmented reality experience.

7. The method of claim 1, wherein the computing device comprises a head-mounted display device.

8. A computing system, comprising:
a processor; and
memory comprising instructions executable by the processor to:
receive user input data targeting an object in an environment with which to associate an emoji, the object comprising a location in a coordinate system of the environment;
receive hand tracking data representing a pose of a hand in the coordinate system, the hand tracking data comprising data regarding a spatial position in the coordinate system of each of a plurality of joints of a hand model;
based on the hand tracking data, recognize a hand gesture;
identify an emoji corresponding to the hand gesture;
output the emoji for display as associated with the object; and
send an instruction to one or more other computing devices to present the emoji as associated with the object.

9. The computing system of claim 8, wherein the instructions executable to receive the user input data targeting the object comprise instructions executable to receive user input data targeting a physical object or a virtual object.

10. The computing system of claim 8, wherein the instructions executable to receive the user input data targeting the object comprise instructions executable to receive user input data comprising one or more of a gaze input, a pointing gesture, a speech input, or a head gesture.

11. The computing system of claim 8, wherein the instructions executable to identify the emoji corresponding to the hand gesture comprise instructions executable to identify an emoji comprising of one or more of static imagery, animated imagery, video, or sound.

12. The computing system of claim 8, wherein the emoji comprises a multichannel audio signal that encodes a spatial origin of the emoji in the coordinate system.

13. The computing system of claim 8, wherein the instructions executable to send the instructions comprise instructions executable to send the instructions to all display devices sharing an augmented reality experience.

14. The computing system of claim 8, wherein the computing system comprises a head-mounted display device.

15. A physical computer-readable storage device comprising instructions executable by a computing device to control the computing device to:
receive user input data targeting an object in an environment with which to associate an emoji, the object being located at a location in a coordinate system of the environment;
receive hand tracking data representing a pose of a hand in the coordinate system, the hand tracking data comprising data regarding a spatial position in the coordinate system of each of a plurality of joints of a hand model;
based on the hand tracking data, recognize a hand gesture;
identify an emoji corresponding to the hand gesture;
output the emoji for display as associated with the object; and
send an instruction to one or more other computing devices to present the emoji as associated with the object.

16. The physical computer-readable storage device of claim 15, wherein the instructions executable to receive the user input data targeting the object comprise instructions executable to receive user input data targeting a physical object or a virtual object.

17. The physical computer-readable storage device of claim 15, wherein the instructions executable to receive the user input data targeting the object comprise instructions executable to receive user input data comprising a gaze input, a pointing gesture, a speech input, or a head gesture.

18. The physical computer-readable storage device of claim 15, wherein the instructions executable to receive the hand tracking data to identify the emoji corresponding to the hand gesture comprise instructions executable to identify an emoji comprising of one or more of static imagery, animated imagery, video, or sound.

19. The physical computer-readable storage device of claim 15, wherein the emoji comprises a multichannel audio signal that encodes a spatial origin of the emoji in the coordinate system.

20. The physical computer-readable storage device of claim 15, wherein the instructions executable to sending the instructions comprises sending the instructions to all display devices sharing an augmented reality experience.

* * * * *